United States Patent
Arya et al.

(10) Patent No.: US 10,359,775 B2
(45) Date of Patent: *Jul. 23, 2019

(54) MANAGING ELECTRICITY USAGE FOR AN APPLIANCE

(71) Applicants: International Business Machines Corporation, Armonk, NY (US); Universiti Brunei Darussalam, Brunei Darussalam (BN)

(72) Inventors: Vijay Arya, Bangalore (IN); Tanuja Hrishikesh Ganu, Bangalore (IN); Saiful A. Husain, Brunei Darussalum (BN); Shivkumar Kalyanaraman, Bangalore (IN); Ashok Pon Kumar, Bangalore (IN); Chandratilak De Silva Liyanage, Brunei Darussalum (BN); Dwi Rahayu, Victoria (AU); Devasenapathi Periagraharam Seetharamakrishnan, Bangalore (IN)

(73) Assignees: INTERNATIONAL BUSINESS MACHINES CORPORATION, Armonk, NY (US); UNIVERSITI BRUNEI DARUSSALAM (BN)

( * ) Notice: Subject to any disclaimer, the term of this patent is extended or adjusted under 35 U.S.C. 154(b) by 253 days.

This patent is subject to a terminal disclaimer.

(21) Appl. No.: 15/288,191

(22) Filed: Oct. 7, 2016

(65) Prior Publication Data
US 2017/0023936 A1 Jan. 26, 2017

Related U.S. Application Data

(62) Division of application No. 13/951,901, filed on Jul. 26, 2013, now Pat. No. 9,465,376.

(51) Int. Cl.
*G06F 19/00* (2018.01)
*G05B 23/02* (2006.01)
*G05B 15/02* (2006.01)

(52) U.S. Cl.
CPC ......... *G05B 23/0291* (2013.01); *G05B 15/02* (2013.01); *G05B 2219/23316* (2013.01); *G05B 2219/2642* (2013.01)

(58) Field of Classification Search
CPC ............... G05B 23/0291; G05B 15/02; G05B 2219/2642; G05B 2219/23316
See application file for complete search history.

(56) References Cited

U.S. PATENT DOCUMENTS 6,487,059 B2 11/2002 Bontempo et al.
7,783,058 B2 8/2010 Stephan et al.
(Continued)

FOREIGN PATENT DOCUMENTS

WO WO2009109787 A1 9/2009

OTHER PUBLICATIONS

Meet the Appliance Module, Plugload Monitoring and Control, Appliance Module RD75613/RD75615, 2 pages, available at http://jetlun.com/75613.html, Accessed Jan. 31, 2013.
(Continued)

*Primary Examiner* — Michael D Masinick
(74) *Attorney, Agent, or Firm* — Ference & Associates LLC (57) ABSTRACT

One embodiment provides a method including: prior to an initial period of operation of an appliance, storing in memory a first set of characteristics of the appliance; during an initial period of operation of the appliance, learning a second set of characteristics of the appliance; during subsequent operation of the appliance: detecting an adverse operating condition of the appliance; and based on the first
(Continued)

set of characteristics, the second set of characteristics and the detected adverse operating condition, determining a corrective action to be taken with regard to the appliance, the corrective action comprising at least one of: switching off the appliance and warning a user of the detected adverse operating condition. Other aspects are described and claimed.

18 Claims, 7 Drawing Sheets

(56) References Cited

U.S. PATENT DOCUMENTS

| | | | |
|---|---|---|---|
| 7,890,284 B2 | 2/2011 | Patterson et al. | |
| 7,912,668 B2 | 3/2011 | Stephan et al. | |
| 8,571,720 B2 | 10/2013 | Yonezawa et al. | |
| 9,465,376 B2* | 10/2016 | Arya | G05B 15/02 |
| 2007/0155349 A1 | 7/2007 | Nelson et al. | |
| 2009/0307178 A1 | 12/2009 | Kuhns et al. | |
| 2010/0191487 A1* | 7/2010 | Rada | G05F 1/70 702/60 |
| 2011/0106328 A1 | 5/2011 | Zhou et al. | |
| 2011/0172841 A1 | 7/2011 | Forbes, Jr. | |
| 2011/0196547 A1 | 8/2011 | Park et al. | |
| 2012/0004871 A1 | 1/2012 | Tsao et al. | |
| 2014/0336831 A1 | 11/2014 | Seo et al. | |
| 2015/0032282 A1* | 1/2015 | Arya | G05B 15/02 700/297 |
| 2017/0023936 A1* | 1/2017 | Arya | G05B 15/02 |

OTHER PUBLICATIONS

Circle, "The Circle Measures Energy Consumption and Wirelessly Switches Appliances," Technical Information, Plugwise, 2 pages, available at http://www.plugwise.com/idplugtype-f/circle, Accessed Jan. 31, 2013.

Energy Center of Wisconsin, "Electricity Savings Opportunities for Home Electronics and Other Plug-In Devices in Minnesota Homes," A Technical and Behavioral Field Assessment, May 2010, 94 pages, Energy Center of Wisconsin with the assistance of Conservation Connection Consulting, Madison, Wisconsin, USA.

Lee, Shih-Chiang et al., "Appliance Recognition and Unattended Appliance Detection for Energy Conservation," 2010, 8 pages, Association for the Advancement of Artificial Intelligence, www.aaai.org.

Hamerly, Greg et al., "Learning the k in k-means," Neural Information Processing Systems, 2003, 8 pages, available at http://machinelearning.wustl.edu/mlpapers/paper_files/NIPS2003_AA36.pdf.

Embertec, "Energy Efficiency Technologies," Instruction Booklet, Apr. 2013, 20 pages, available at http://embertec.com.au/wp-content/uploads/2013/04/EPAUPC-User-Manual-V3.pdf.

Iwayemi, Abiodun et al., "Energy Management for Intelligent Buildings," in Energy Management Systems, edited by P. Giridhar Kini, Aug. 1, 2011, 32 pages, available at http://www.intechopen.com/books/energy-management-systems/energy-management-for-intelligent-buildings, Accessed Jul. 19, 2013.

Rabiner, Lawrence R., "A Tutorial on Hidden Markov Models and Selected Applications in Speech Recognition," Proceedings of the IEEE, Feb. 1989, pp. 257-286, vol. 77, No. 2, IEEE Digitial Library, Washington, DC, USA.

* cited by examiner

MANAGING ELECTRICITY USAGE FOR AN APPLIANCE

CROSS REFERENCE TO RELATED APPLICATIONS

This application is a divisional application of U.S. patent application Ser. No. 13/951,901, filed on Jul. 26, 2013, and entitled "MANAGING ELECTRICITY USAGE FOR AN APPLIANCE," the contents of which are incorporated by reference herein.

BACKGROUND

Generally, global electricity consumption and production continue to increase at a significant rate. Much of the attendant demand originates from the residential and commercial sectors. The impact of these sectors on power grids could become even more pronounced in coming years given projections of sharp increases in demand.

Trends are thus developing to design and operate residential (or commercial) appliances with an increasing emphasis on energy efficiency. Governments have come to mandate strict energy efficiency standards, and some solutions have been proposed to reduce or eliminate idle mode consumption and/or to analyze appliance-specific energy use data. However, current mandates and solutions are inadequate for a variety of reasons, not the least of which include: older, "grandfathered-in" appliances that waste too much energy in standby modes; a tendency for malfunctioning appliances to escape timely detection; appliance-specific solutions that lack universal applicability; and a need to employ technological infrastructure that might be inaccessible or unavailable to many residences or commercial establishments.

BRIEF SUMMARY

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

In summary, one aspect of the invention provides a method comprising: prior to an initial period of operation of an appliance, storing in memory a first set of characteristics of the appliance; during an initial period of operation of the appliance, learning a second set of characteristics of the appliance; during subsequent operation of the appliance: detecting an adverse operating condition of the appliance; and based on the first set of characteristics, the second set of characteristics and the detected adverse operating condition, determining a corrective action to be taken with regard to the appliance, the corrective action comprising at least one of: switching off the appliance and warning a user of the detected adverse operating condition.

Another aspect of the invention provides an apparatus comprising: at least one processor; and a computer readable storage medium having computer readable program code embodied therewith and executable by the at least one processor, the computer readable program code comprising: computer readable program code that, prior to an initial period of operation of an appliance, stores in memory a first set of characteristics of the appliance; computer readable program code that, during an initial period of operation of the appliance, learns a second set of characteristics of the appliance; computer readable program code that, during subsequent operation of the appliance: detects an adverse operating condition of the appliance; and based on the first set of characteristics, the second set of characteristics and the detected adverse operating condition, determines a corrective action to be taken with regard to the appliance, the corrective action comprising at least one of: switching off the appliance and warning a user of the detected adverse operating condition.

An additional aspect of the invention provides a computer program product comprising: a computer program product comprising: a computer readable storage medium having computer readable program code embodied therewith, the computer readable program code comprising: computer readable program code that, prior to an initial period of operation of an appliance, stores in memory a first set of characteristics of the appliance; computer readable program code that, during an initial period of operation of the appliance, learns a second set of characteristics of the appliance; computer readable program code that, during subsequent operation of the appliance: detects an adverse operating condition of the appliance; and based on the first set of characteristics, the second set of characteristics and the detected adverse operating condition, determines a corrective action to be taken with regard to the appliance, the corrective action comprising at least one of: switching off the appliance and warning a user of the detected adverse operating condition.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-6. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 7. In accordance with an example embodiment, most if not all of the process steps, components and outputs discussed with respect to FIGS. 1-6 can be performed or utilized by way of a processing unit or units and system memory such as those indicated, respectively, at 16' and 28' in FIG. 7, whether on a server computer, a client computer, a node computer in a distributed network, or any combination thereof.

Figure 1:
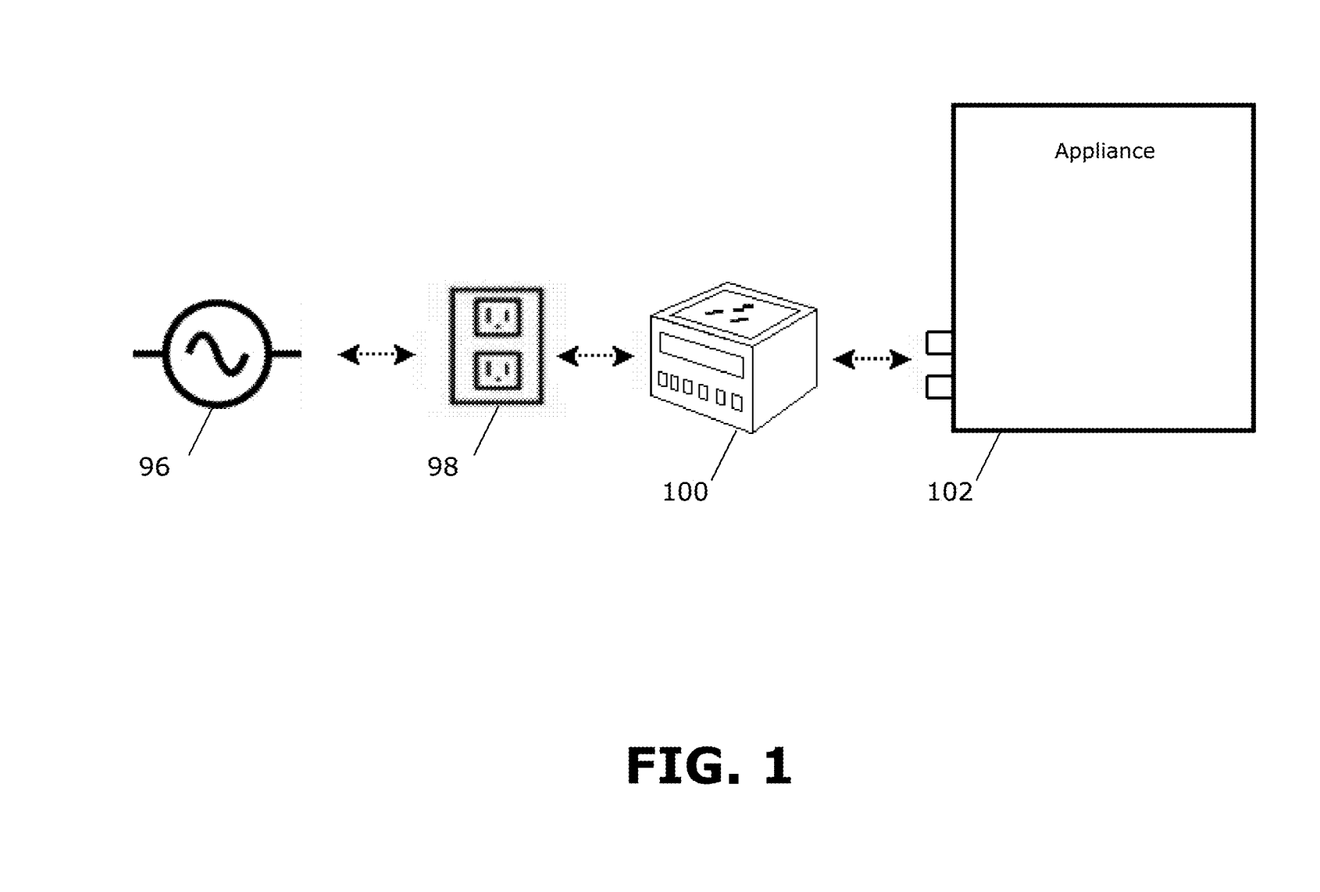
FIG. 1 sets forth a general system diagram.

Broadly contemplated herein, in accordance with at least one embodiment of the invention, are methods and arrangements for appliance power delivery in which, in the context of variable delivery or demand, there is no need for communication infrastructure or any changes to the appliance or grid. Existing appliances can be simply plugged into a "watt seal" (as broadly described and contemplated herein), and the watt seal into a wall socket. FIG. 1 provides a system diagram schematically illustrating such an arrangement. The watt seal 100 (plugged into a wall socket 98, itself connected with a power supply or grid 96) acts in a manner to automatically detect the appliance 102 connected to it, and can automatically configure or adapt its operating characteristics depending on such detection. The watt seal 100 can act to warn users when the appliance is operating at an abnormal power level (or malfunctioning in some other manner), and/or when the power quality in the power line is bad and might affect the appliance 102 in its current working state.

In accordance with at least one embodiment of the invention, the watt seal 100 acts to automatically learn if the appliance is currently in standby mode and a user's preferences for time of use (with regard to the connected appliance 102). In this manner, the appliance 102 can be turned off automatically and pre-emptively when it is not in use and will not be used immediately, preventing "standby" power wasting without causing great inconvenience to the user.

Figure 2:
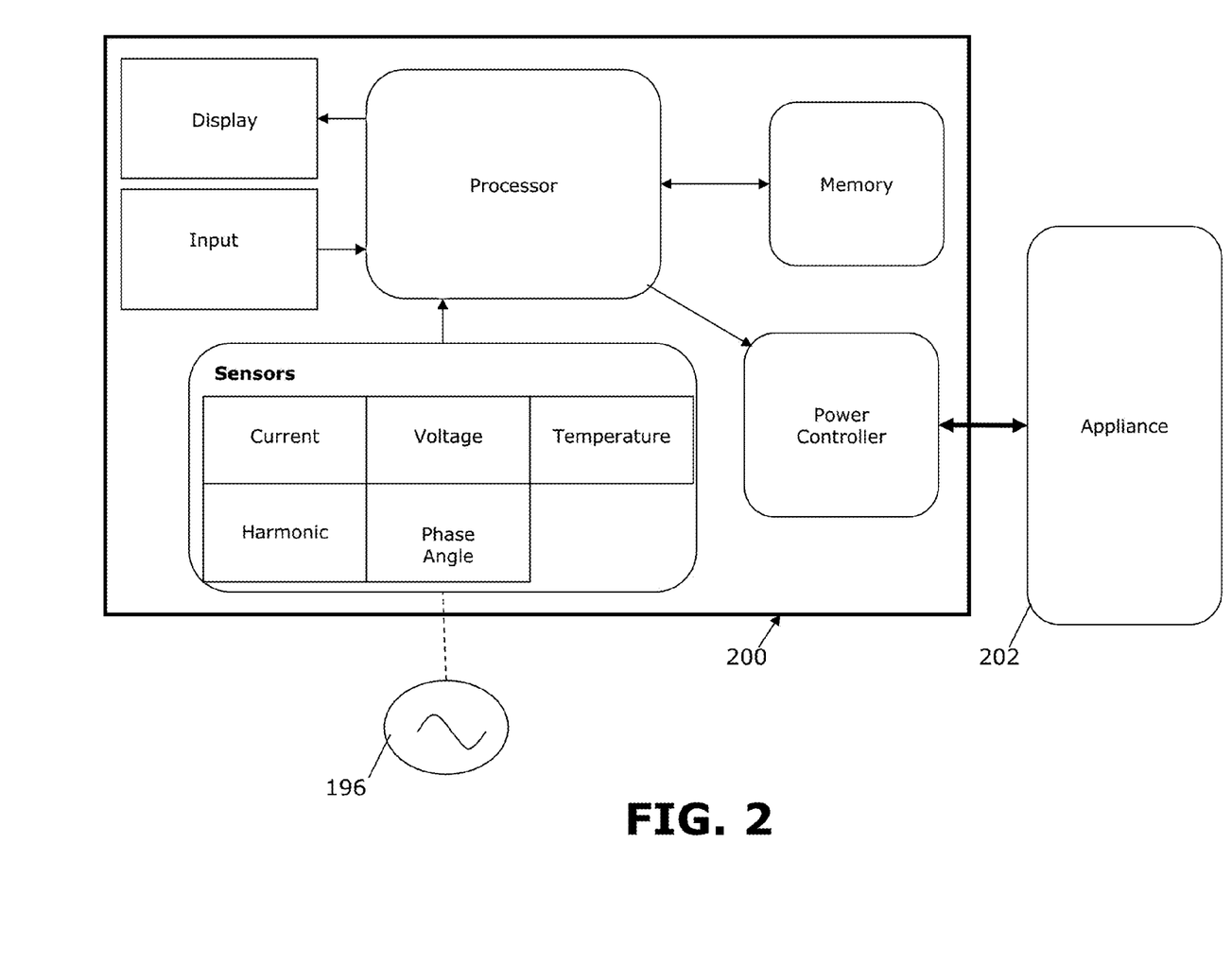
FIG. 2 schematically sets forth an overview of system hardware.

FIG. 2 schematically sets forth an overview of system hardware, in accordance with at least one embodiment of the invention. As shown, the watt seal 200 (into which appliance 202 is connected) includes sensors that are able to sense aspects of the grid 196. The sensors can include current, voltage or harmonic sensors, or any combination of these, as well as essentially any other type of useful sensors such as temperature or vibration sensors. These, in turn, are connected to a processor. The processor is in communication with a memory and a power controller, as well as an external display and an external user input medium.

Figure 3:
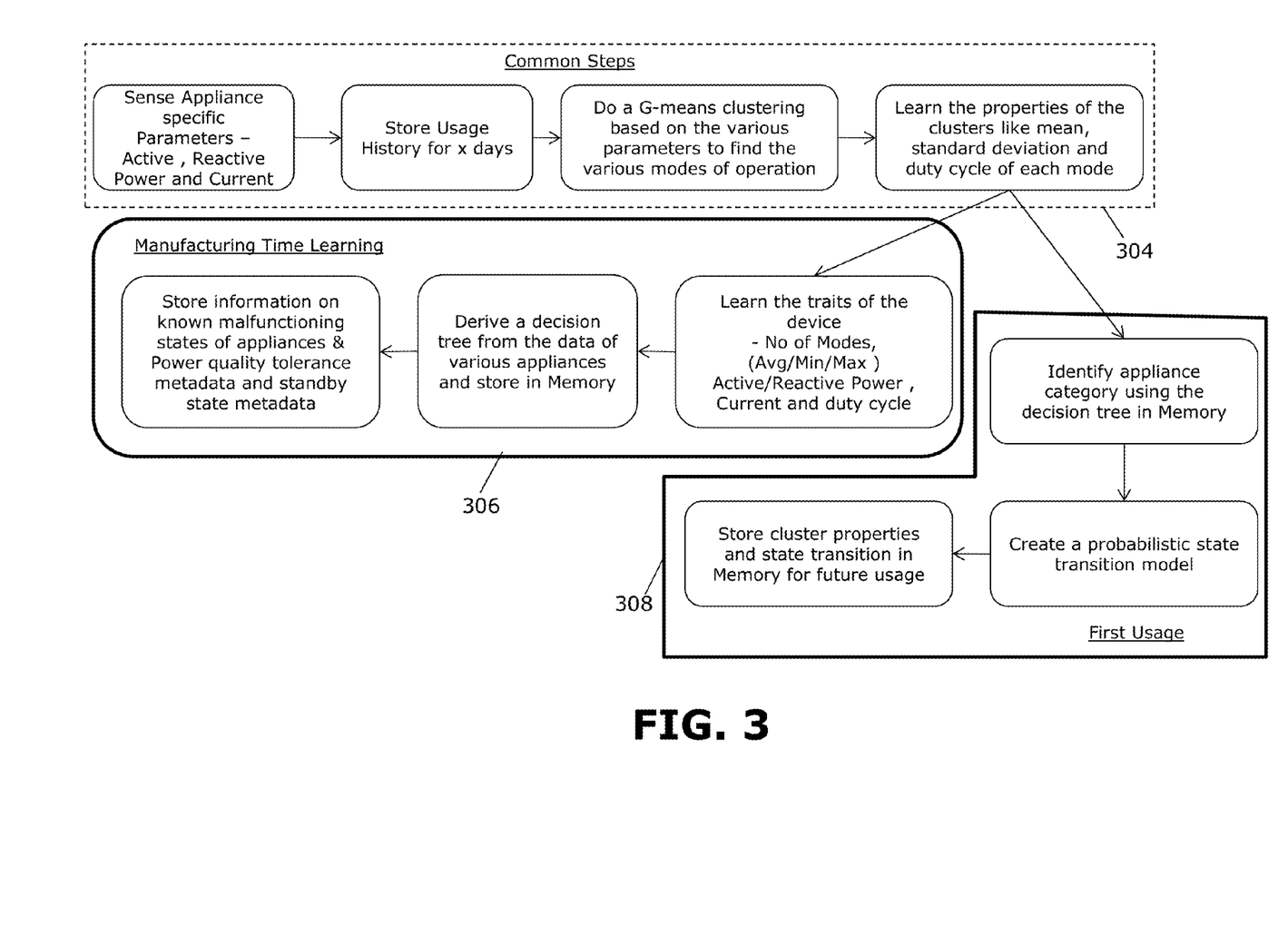
FIG. 3 schematically sets forth a process flow for a learning phase.

FIG. 3 schematically sets forth a process flow for a learning phase, in accordance with at least one embodiment of the invention. As shown, learning can take place at a manufacturing stage (306) and upon first usage (by a user) (308), with some steps being common to both scenarios (304). In both scenarios (via common steps 304), appliance-specific parameters are sensed, including power and current (both active and reactive in each case). Usage history is stored for a predetermined time (e.g., this can be a preset, such as a certain number of days, or can be set by the user via input into the watt seal), and then a G-means clustering is performed based on various parameters to determine various modes of operation. (For background purposes, G-means clustering is discussed in G. Hamerly and C. Elkan, "Learning the k in k-means", Neural Information Processing Systems, MIT Press, 2003.) Modes of operation can be defined broadly with respect to different appliances and can represent commonly encountered modes that either take place by happenstance, or can be preset at the factory or by a user, or controlled by a user. (Thus, by way of an example, refrigerator modes of operation can include "compressor on", "compressor off", "defrost heating" and "door open". For a water heater, modes of operation can include "heating on", "heating off" and "standby". For a washing machine, modes of operation could include any of the pre-established cycles such as soak, rinse, spin, etc.) Properties of each of the determined clusters can then be learned, such as mean, standard deviation, and a duty cycle (expressed in length of time) of each mode.

In accordance with at least one embodiment of the invention, manufacturing time learning 306 includes learning traits of the device, such as the number of modes, active/reactive power and current, and duty cycles. A decision tree is derived from data of appliances and stored in memory of the watt seal. Information on known malfunctioning states of appliances is stored, along with power quality tolerance metadata and standby state metadata. Generally, manufacturing time learning can be executed in offline fashion by surveying various appliances in use, e.g., multiple refrigerators, multiple TVs, etc., in order to understand general attributes of such appliances, across each type of appliance. Such attributes can then be loaded into the "watt seal" plug (described herein) before the "watt seal" plug is first used by a consumer.

In accordance with at least one embodiment of the invention, first-usage learning 308 includes identifying the appliance category (e.g., the type of appliance, such as a washing machine, water heater, clothes dryer, etc.) using the decision tree now in the watt seal memory. A probabilistic state transition model and the cluster properties (determined previously) are stored in memory for future usage.

In identifying an appliance category, in accordance with at least one embodiment of the invention, it is recognized that the plug has information such as the number of modes, Avg/Min/Max Active/Reactive Power, current and duty cycle of various appliance. It derives a decision tree from the various characteristics of the various appliances. When it encounters a device in normal operation, after identifying the normal modes of operation, it uses the decision tree to identify the device. It does not require any modification in the device, and identifies the device just from the power usage pattern without any communication, with just using the information inside the watt seal.

Figure 4:
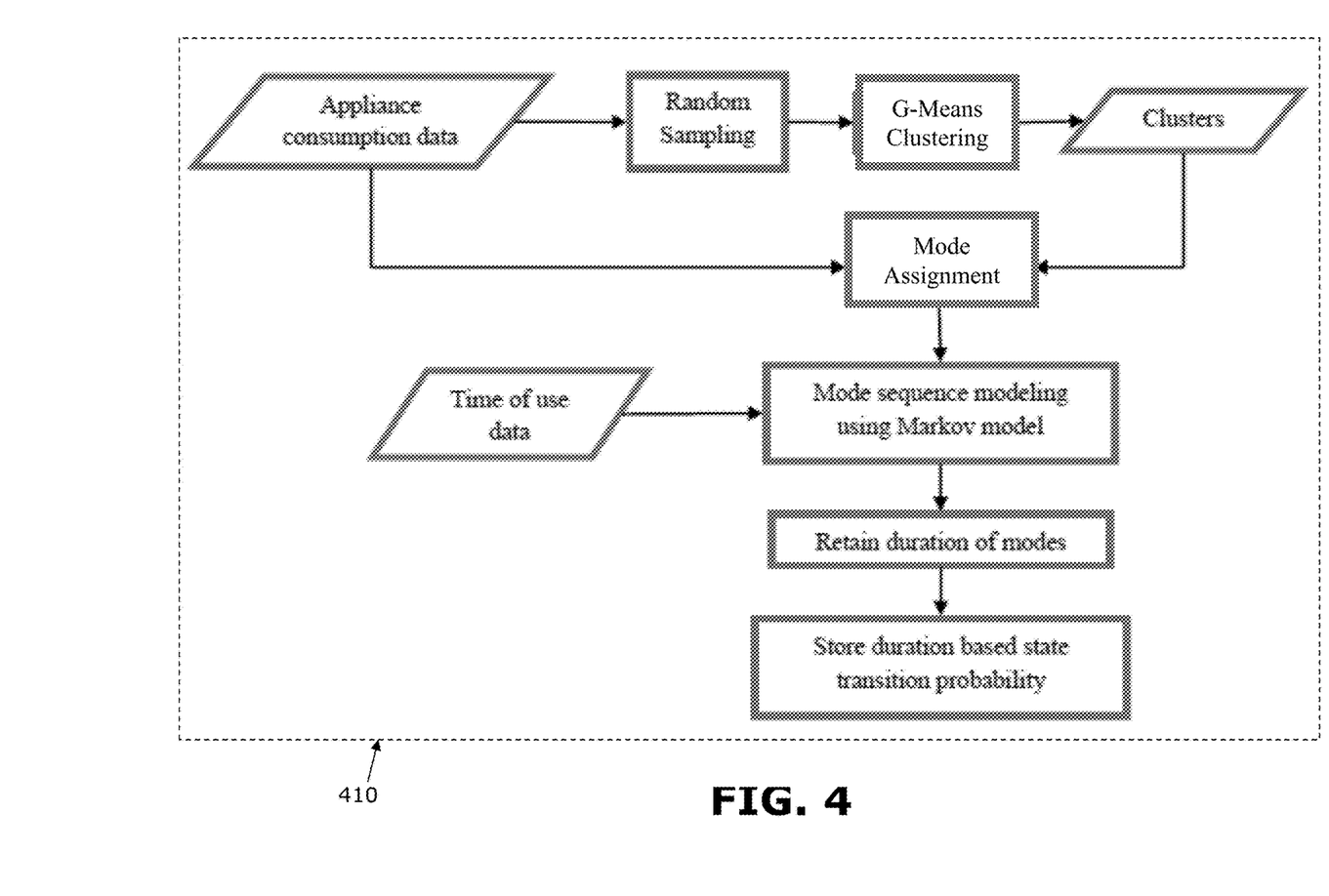
FIG. 4 schematically illustrates a process of building appliance models.

FIG. 4 schematically illustrates a process 410 of building appliance models, in accordance with at least one embodiment of the invention, as part of one or more aspects of a manufacturing time or first-usage learning process. In building appliance models, it can be recognized that energy utilization in various modes follows a normal distribution. A G-Means algorithm thus finds the clusters, and state transitions with probability can be derived from the data.

Accordingly, in accordance with at least one embodiment of the present invention, randomly sampled appliance consumption data undergo G-means clustering to find the clusters, and thereby (as discussed hereabove) derive or designate modes of operation of the appliance. With time of use data additionally input, a Hidden Markov Model can be used for mode sequence modeling. (For background purposes, a basic discussion of Hidden Markov Models is found in L. Rabiner, "A tutorial on Hidden Markov Models and selected applications in speech recognition," Proceedings of the IEEE 77(2):257-286, 1989.) The duration of each mode is stored/retained, and duration-based state transition probabilities are stored/retained also.

Figure 5:
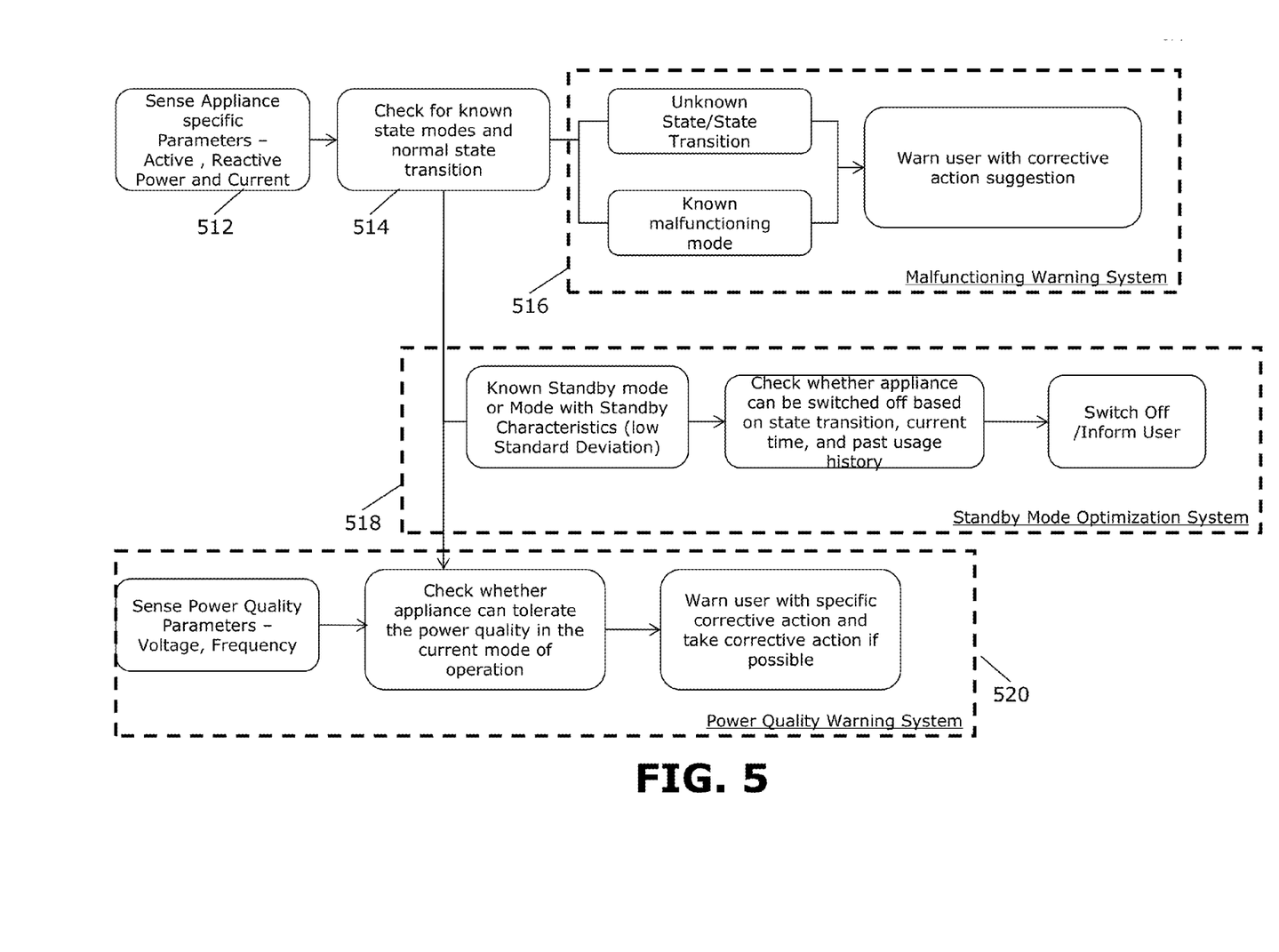
FIG. 5 schematically sets forth a process flow for a usage phase.

FIG. 5 schematically sets forth a process flow for a usage phase, in accordance with at least one embodiment of the invention. (This usage phase is subsequent to and distinct from the "first usage" or "initial usage" phase otherwise described herein. Particularly, the "first usage" or "initial usage" phase involves learning a characteristic behavior pattern of the attached appliance, and can last a predetermined period of time, e.g., a few weeks, by way of gathering sufficient data. The "usage phase" now to be described involves identifying standby or malfunction, and thus takes place after the characteristic behavior pattern has already been learned in the "first usage" or "initial usage" phase.) As shown, appliance-specific parameters are sensed (e.g., active/reactive power and current) (512). A check is made for known state modes and any normal state transition (514). If (518) a known standby mode, or a mode with standby characteristics (within a low standard deviation) is detected, a check is made as to whether the appliance can be switched off based on any or all of: appliance type, state transition, time of day (indicating a user's preference in connection with using this appliance), and past usage history. If appropriate criteria are fulfilled, then the appliance is switched off.

More particularly, in identifying a standby mode, in accordance with at least one embodiment of the invention, there are identified the various modes using the g-means clustering algorithm. There are found the modes which have the following characteristics, which are the normal standby states: Low Standard Deviation; Low Power State; Heavy duty cycle (Stays long in the state). Further, there are identified non-normal standby states using knowledge about the device from the memory, and standby states for switching off power based on the state transition, duty cycle and other metadata. Generally, a standby state is identified based on extended characteristics rather than just assuming the lowest power state as the standby state. There is a differentiation between an intermittent standby state and standby states when the device can be switched off. There are detected non-normal standby states using a characterization of the device stored in the memory.

In detecting power quality problems (520), in accordance with at least one embodiment of the invention, power quality parameters such as voltage and frequency are first sensed. A check is then made as to whether the appliance can tolerate the attendant power quality in the current mode of operation. If such tolerability is not determined, then the user is warned with a specific corrective action to be taken, and then corrective action may be taken if possible or as needed.

More particularly, in identifying power quality issues, in accordance with at least one embodiment of the invention, a plug identifies the state of operation of the appliance, and also determines the power quality at the point in time. If the appliance cannot tolerate the power quality at the particular state of operation, then the plug (watt seal) reports specific feedback. This lets the device run normally even if the power quality is bad, if the device can tolerate the quality of power at the particular state of operation of the device.

In accordance with at least one embodiment of the invention, via a general malfunctioning warning system 516, a check is made for any other known malfunctioning mode, otherwise the possibility of an unknown state or state transition is assessed.

In identifying a malfunctioning mode, in accordance with at least one embodiment of the invention, a "watt seal" plug auto-learns about the normal usage pattern of the appliance by understanding the various modes of operation of the appliance and the state transition between the modes. A probabilistic mode transition model can be employed for the purpose, utilizing: a characterization of active or reactive power, of power factor, and/or of duration); a frequency of modes; and a duty cycle of the modes. The plug detects an anomaly in the following conditions: change in overall power consumption per day/per mode/shift in mean or standard deviations of mode; unknown state of operation; stays in a particular state for lesser or more time than expected; unknown state transition; unexpectedly frequency of occurrence of the mode; known malfunctioning state. It is completely generic, where it learns the normal working state of the appliance and identifies malfunction. It is a completely embedded plug (watt seal) which can detect aging and faults in the appliance and does not need any modification either on the grid side or on the appliance side.

In accordance with at least one embodiment of the invention, if an unknown state or state transition is in play, or a known malfunctioning mode is in play, the user can be warned with suggestions for corrective action for the improper usage or malfunction in question.

Figure 6:
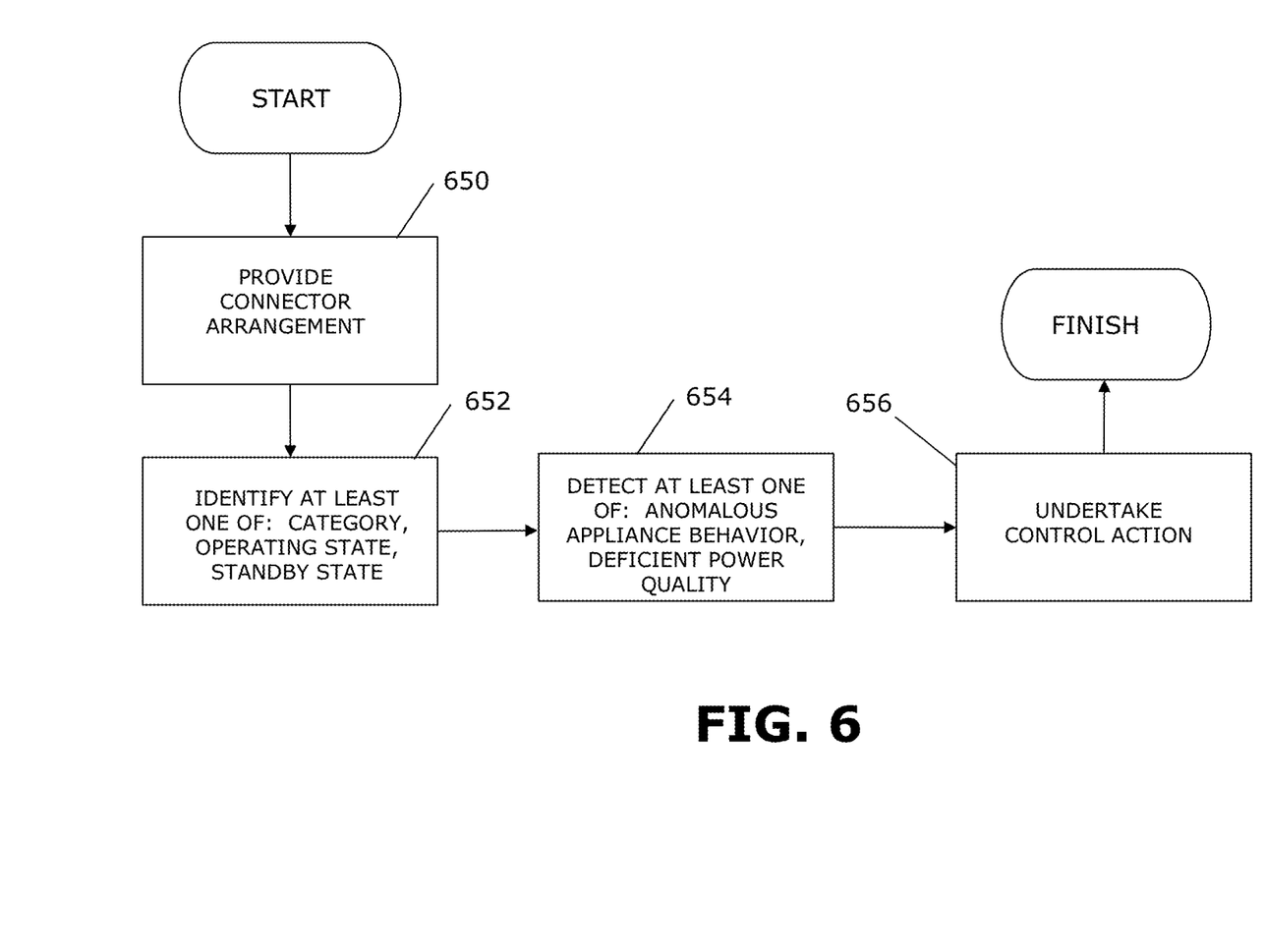
FIG. 6 sets forth a process more generally for providing appliance power management

FIG. 6 sets forth a process more generally for providing appliance power management, in accordance with at least one embodiment of the invention. It should be appreciated that a process such as that broadly illustrated in FIG. 6 can be carried out on essentially any suitable computer system or set of computer systems, which may, by way of an illustrative and non-restrictive example, include a system such as that indicated at 12' in FIG. 7. In accordance with an example embodiment, most if not all of the process steps discussed with respect to FIG. 6 can be performed by way of a processing unit or units and system memory such as those indicated, respectively, at 16' and 28' in FIG. 7.

As shown in FIG. 6, in accordance with at least one embodiment of the invention, a connector arrangement is provided for interconnecting an appliance with a power supply (650). There is identified, with respect to the appliance connected to the power supply, at least one of: an appliance category, a current operating state of the appliance, and a current standby state of the appliance (652). In response to the identifying of the at least one of: an appliance category, an appliance operating state and an appliance standby state, there is detected at least one of: anomalous appliance behavior and deficient power quality (654). Also, a control action is undertaken relative to the detection of the at least one of: anomalous appliance behavior and deficient power quality (656).

Figure 7:
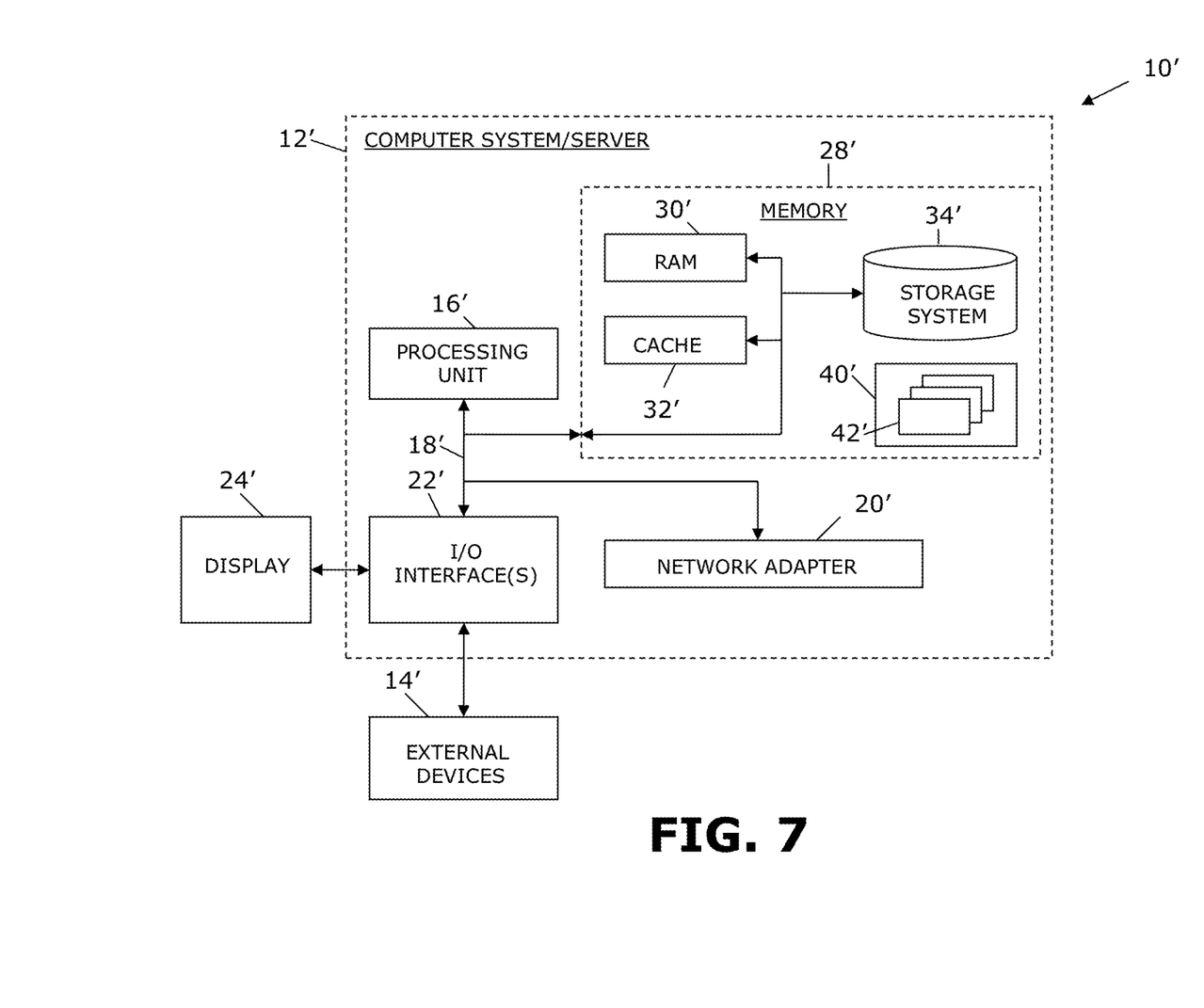
FIG. 7 illustrates a computer system.

Referring now to FIG. 7, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
   prior to an initial period of operation of an appliance, storing in memory, a first set of characteristics of the appliance;
   clustering, using a g-means clustering technique, received power consumption information;
   during an initial period of operation of the appliance, learning a second set of characteristics of the appliance, wherein the learning is based at least in part upon the clustered received power consumption information;
   during subsequent operation of the appliance:
      detecting an adverse operating condition of the appliance; and
      based on the first set of characteristics, the second set of characteristics and the detected adverse operating condition, determining a corrective action to be taken with regard to the appliance, the corrective action comprising at least one of: switching off the appliance and warning a user of the detected adverse operating condition.

2. The method of claim 1, wherein the first set of characteristics comprises at least one characteristic selected from the group consisting of: an appliance category, an operating state of the appliance, and a standby state of the appliance.

3. The method of claim 1, wherein the second set of characteristics of the appliance comprises at least one characteristic selected from the group consisting of: an appliance category, an operating state of the appliance, and a standby state of the appliance.

4. The method of claim 1, wherein the second set of characteristics is based upon the clustered power consumption information related to the appliance.

5. The method of claim 1, wherein the power consumption information is received from a power connector connected to the appliance.

6. The method of claim 1, wherein the detecting an adverse operating condition of the appliance comprises detecting deficient power quality.

7. The method of claim 6, wherein detecting deficient power quality comprises sensing power quality parameters.

8. The method of claim 1, wherein the detecting an adverse operation condition of the appliance comprises detecting an anomaly selected from the group consisting of: an unknown appliance state, an appliance state transition, and a known appliance malfunctioning mode.

9. The method of claim 1, wherein both the first set of characteristics and the second set of characteristics comprise an appliance category, wherein the appliance category is identified, using a decision tree, based upon operating characteristics of the appliance.

10. An apparatus comprising:
at least one processor; and
a computer readable storage medium having computer readable program code embodied therewith and executable by the at least one processor, the computer readable program code comprising:
computer readable program code that, prior to an initial period of operation of an appliance, stores in memory a first set of characteristics of the appliance;
computer readable program code that clusters, using a g-means clustering technique, received power consumption information;
computer readable program code that, during an initial period of operation of the appliance, learns a second set of characteristics of the appliance, wherein the learning is based at least in part upon the clustered received power consumption information;
computer readable program code that, during subsequent operation of the appliance:
 detects an adverse operating condition of the appliance; and
 based on the first set of characteristics, the second set of characteristics and the detected adverse operating condition, determines a corrective action to be taken with regard to the appliance, the corrective action comprising at least one of: switching off the appliance and warning a user of the detected adverse operating condition.

11. A computer program product comprising:
a computer readable storage medium having computer readable program code embodied therewith, the computer readable program code comprising:
computer readable program code that, prior to an initial period of operation of an appliance, stores in memory a first set of characteristics of the appliance;
computer readable program code that clusters, using a g-means clustering technique, received power consumption information;
computer readable program code that, during an initial period of operation of the appliance, learns a second set of characteristics of the appliance, wherein the learning is based at least in part upon the clustered received power consumption information;
computer readable program code that, during subsequent operation of the appliance:
 detects an adverse operating condition of the appliance; and
 based on the first set of characteristics, the second set of characteristics and the detected adverse operating condition, determines a corrective action to be taken with regard to the appliance, the corrective action comprising at least one of: switching off the appliance and warning a user of the detected adverse operating condition.

12. The computer program product of claim 11, wherein the first set of characteristics comprises at least one characteristic selected from the group consisting of: an appliance category, an operating state of the appliance, and a standby state of the appliance.

13. The computer program product of claim 11, wherein the second set of characteristics of the appliance comprises at least one characteristic selected from the group consisting of: an appliance category, an operating state of the appliance, and a standby state of the appliance.

14. The computer program product of claim 11, wherein the second set of characteristics is based upon the clustered power consumption information related to the appliance.

15. The computer program product of claim 11, wherein the power consumption information is received from a power connector connected to the appliance.

16. The computer program product of claim 11, wherein the detecting an adverse operating condition of the appliance comprises detecting deficient power quality.

17. The computer program product of claim 11, wherein the detecting an adverse operation condition of the appliance comprises detecting an anomaly selected from the group consisting of: an unknown appliance state, an appliance state transition, and a known appliance malfunctioning mode.

18. The computer program product of claim 11, wherein both the first set of characteristics and the second set of characteristics comprise an appliance category, wherein the appliance category is identified, using a decision tree, based upon operating characteristics of the appliance.

* * * * *